Jan. 20, 1970  J. B. GORDON  3,490,845
METHOD AND APPARATUS FOR PRINTING ANAMORPHIC MOTION PICTURES
Filed May 2, 1967
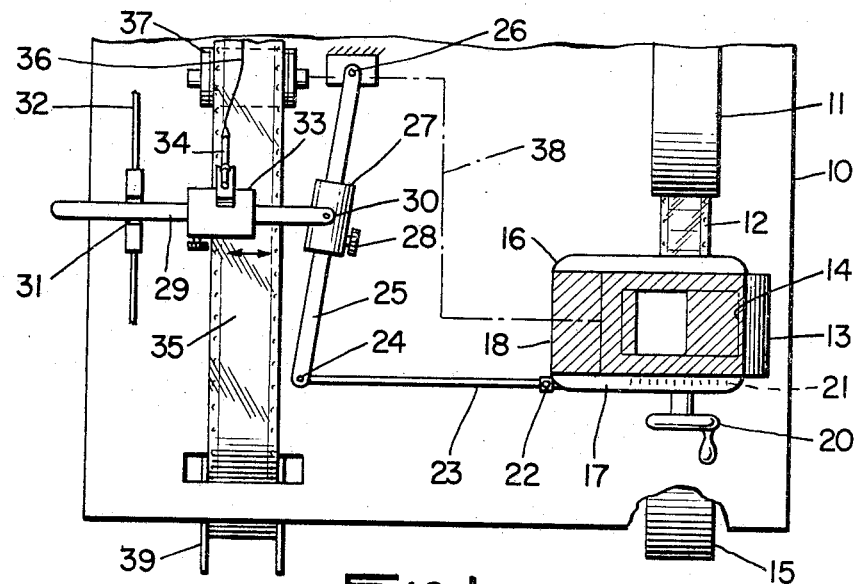
FIG. 1.
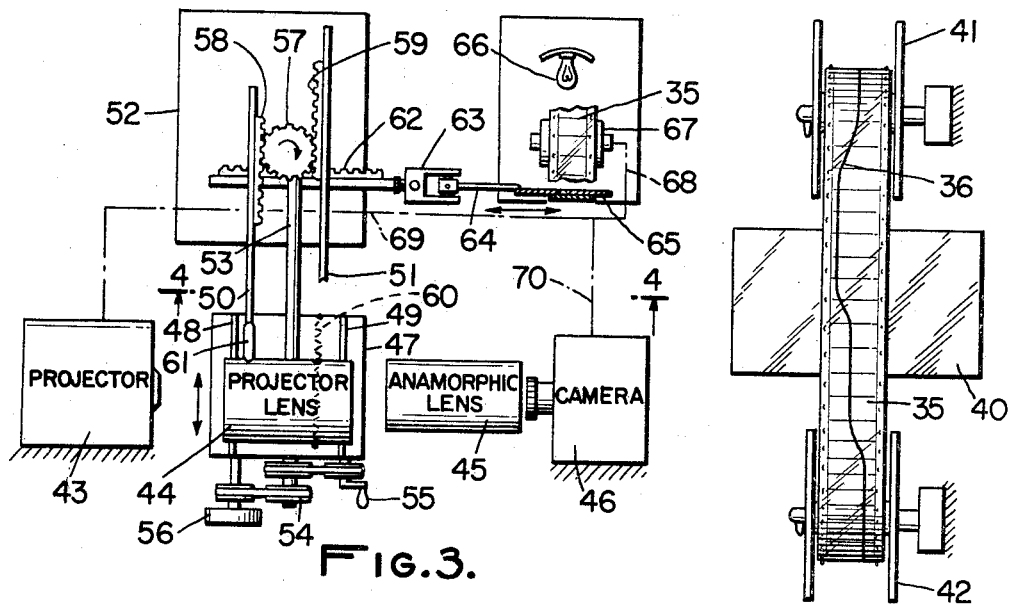
FIG. 3.
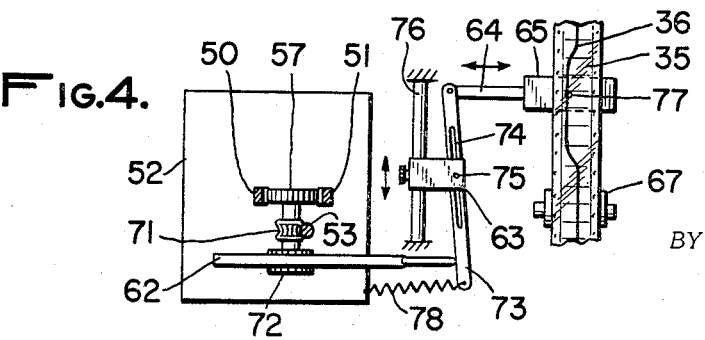
FIG. 4.
FIG. 2.
INVENTOR.
JAMES B. GORDON
BY
Elliott & Pastoriza
ATTORNEYS

United States Patent Office 3,490,845
Patented Jan. 20, 1970

3,490,845
METHOD AND APPARATUS FOR PRINTING ANAMORPHIC MOTION PICTURES
James B. Gordon, 4329 Colfax Ave., Studio City, Calif. 91604
Filed May 2, 1967, Ser. No. 635,469
Int. Cl. G03b 27/68, 27/58, 27/32
U.S. Cl. 355—52                                      4 Claims

ABSTRACT OF THE DISCLOSURE

A method and apparatus are provided for facilitating the printing of desired portions of anamorphic motion pictures on standard film for projection through a standard projector not equipped with an anamorphic lens. The system contemplates a frame defining a picture area covering a portion of the anamorphic motion pictures which can be accommodated on a standard film. This frame is moved across a viewing screen as the pictures are being projected to select desired portions of the scene. A recording on a control strip is made of the movements of the frame and this control strip is then employed to guide subsequent movements of a projection lens during a printing operation to select the desired portions of the anamorphic motion pictures for recording on a film in a standard camera. This standard film may then be projected in a normal manner to provide motion pictures of the desired portions filling the entire television screen when the same is employed for showing on television.

---

This invention relates generally to motion picture printing and more particularly to an improved method and apparatus for printing desired portions of anamorphic motion pictures on standard film for projection through a standard projector not equipped with an anamorphic lens.

For purposes of describing the method and illustrating the apparatus of this invention, a particular example of the use of the resulting product in connection with televising of motion pictures will be set forth. It is to be understood, however, that the method and apparatus involved may be employed for printing anamorphic motion pictures on standard film for uses other than mere projection for showing on television screens.

Normal television screens have vertical and horizontal dimensions corresponding in ratio substantially to that of standard motion picture frames on 35 or 16 mm. motion picture film. Accordingly, there is no problem in televising standard motion pictures and completely filling the home television screen with the motion picture scene. On the other hand, many motion pictures have been made with an anamorphic lens such as to provide a "squeezed" or distorted image on the camera film when the motion picture is made. This arrangement permits a relatively wide angle of view to be recorded on the film. When the film is projected, an anamorphic lens is employed which will expand the "squeezed" image into a wide angle picture and in such instances, theaters are provided with a wide angle screen wherein the width is more than twice the height of the screen to accommodate the picture.

There is no problem in projecting such pictures in normal theaters. However, if such motion pictures are televised, it is not possible to accommodate the entire picture on a television screen unless relatively wide top and bottom margins of the screen are unused. While this latter procedure will result in the entire "cinemascope" or wide angle picture being displayed on the television screen, the entire image is necessarily somewhat smaller. Further, the display of wide upper and lower unused marginal portions of the screen is oftentimes annoying to the viewer.

It is found that not all of the picture area in an anamorphic or wide angle motion picture must be seen at all times in order to convey the story. It is thus possible to select a given picture area by cutting off certain side portions of the picture without loosing any substantial information in the picture. Thus, one solution would be to simply chop off the expanded sides of the viewed picture and simply project the central portion of the expanded picture on a normal size television screen.

While many scenes will be appreciably unaffected by the above process, there are many other scenes wherein important characters are left entirely out of the picture. For example, the wide angle picture may show a table with two people seated at opposite ends talking to each other. If the side portions of the picture are masked or clipped off, the viewer may only see a table and hear voices coming from each side.

The foregoing problem could be overcome if it were possible to continuously vary the selected portion of the wide angle or anamorphic motion pictures to be viewed. Thus, in the above example of two people seated at opposite ends of a table, it would be possible to select a scene making up the left portion of the wide angle picture when the person seated at the left is talking, and then stop the film and select a portion of the right side of the scene when the person seated on the right is talking. Thus, given set areas of the wide angle film could be selected. However, there would still remain a situation in which a person might be walking from the far left side of the screen of the wide angle picture to the right side. In this latter event, there would be required a continuous changing in the portion of the scene to be selected for viewing as the person walked from one side of the picture to the other.

With all of the foregoing considerations in mind, it is accordingly a primary object of the present invention to provide an improved method and apparatus for enabling the conversion of anamorphic type motion pictures into normal type motion pictures for projection through a standard projector not equipped with an anamorphic lens wherein the standard motion picture includes the important scene portions of the anamorphic motion pictures in a continuous manner such that the aforenoted disadvantages of selecting merely given picture areas of the scene such as the central portion or a side portion are avoided all to the end that greater continuity is realizable.

More particularly, it is an object to provide a system in which a standard film may be exposed by anamorphic motion pictures wherein desired scenes may be continuously selected from the anamorphic motion pictures by a simple panning process there being no appreciable increase in labor or expense in producing such standard motion picture film for projection on television screens from anamorphic motion pictures Briefly, these and other objects and advantages of this invention are attained by panning the anamorphic motion pictures while being projected on a viewing screen such as in a moviola with a frame means defining a picture area covering a portion of the anamorphic motion picture which can be accommodated on a standard film for projection without an anamorphic lens. This panning operation enables selection of any desired portions of the expanded scene provided by the anamorphic motion pictures. The panning movements of the frame means are recorded on a control strip which is operated at a speed of movement constituting a given ratio of the speed of projection of the anamorphic motion pictures. This recording preferably takes the form of a simple line on the control strip which will follow a path defining the movements of the frame means.

The anamorphic motion pictures are then positioned in a printing apparatus wherein they are projected through a projection lens and anamorphic lens into a camera for recording on standard film. The projection lens however is mounted for movement by a drive means transversely to the optical path of projection such that only desired scenes from the projected pictures are recorded on the standard film in the camera. The movement of the projection lens is effected in accordance with the recorded line on the control strip so that the resulting pictures recorded on the standard film in the camera include only those scenes initially selected from the anamorphic motion pictures by the picture area defined by the frame means.

The resulting standard film may then be employed in standard projectors without any anamorphic lens and projected for television use or other uses wherein normal sized or dimensioned television screens will be completely filled with the desired portions of the original scenes on the anamorphic motion pictures.

A better understanding of the method and apparatus will be had by now referring to the accompaning drawings, in which:

FIGURE 1 is a highly schematic showing of a viewing means and control strip recording structure for carrying out initial steps in the method of the invention;

FIGURE 2 illustrates apparatus for carrying out an intermediate step in the method of the invention.

FIGURE 3 is a schematic plan view illustrating a subsequent printing operation in accordance with further steps of the method; and, FIGURE 4 is another schematic view of the apparatus of FIGURE 3 looking generally in the direction of the arrows 4-4 of FIGURE 3.

Referring first to FIGURE 1 there is indicated at the upper right a table structure 10 incorporating projection equipment for editing purposes such as a conventional moviola. This structure includes a payout reel 11 for motion picture film 12 which may constitute anamorphic motion pictures wherein the images are squeezed onto the conventional 35 mm. film. This film is projected onto a viewing means 13 having a viewing screen area 14 and thence wound up on a takeup reel 15. A person may view the motion pictures on the viewing screen 14 for review or editing purposes. The equipment described thus far is entirely conventional.

As mentioned heretofore, it is desired to provide a method and apparatus of selecting desired portions of the scene of the anamorphic motion picture viewed on the screen 14 which can be accommodated on standard motion picture film for projection on standard sized screens without the use of an anamorphic lens. Since the anamorphic motion pictures are normally viewed on a wide screen, to be accommodated on a conventional sized screen necessitates removing certain portions of the scene visible on the screen 14. However, the content of the story may be conveyed by selecting the important portions of the scene which may occur in the central area of the picture or shift from one side to the other.

To enable easy selection of the desired portions of the scene on the viewing screen 14, there is provided a frame means comprising upper and lower frame bars 16 and 17 mounting a glass plate 18 which may be translucent or colored except for a clear frame area 19. The frame area 19 defines a picture area somewhat narrower than the viewing screen 14 but which is sized such that it defines a scene portion of the overall picture which can be accommodated on standard film for projection without an anamorphic lens.

As illustrated in FIGURE 1, the lower bar 17 of the frame may be driven by a hand wheel 20 including a suitable gear meshing with a rack portion 21 on the bar such that the frame may be moved back and forth across the viewing screen 14 so that the selected scene portion defined by the clear glass portion 19 can be positioned to overlie any portion of the scene on the viewing screen.

With respect to the foregoing, it should be understood that movement of the frame means defined by the structures 16, 17, and 18 can be continuously effected by rotating the hand wheel 20 in one direction or the other so that panning movements of the frame across the scene can be effected.

The frame means is coupled as by a pivot 22 to one end of a connecting link 23 in turn pivoted at 24 to a lever structure 25. The lever structure 25 is pivoted to a stationary portion 26 on the table 10. The lever 25 slidably supports a carriage 27 which may be locked in a desired position on the lever 25 as by a set screw 28.

A further supporting bar 29 is pivoted at 30 to the carriage 27 at one end and is received in a cradle structure 31 at its other end. The cradle structure can slide on a track 32 as indicated by the double headed arrow so that the bar 29 will remain normal to the edge of the table 10; that is, in a level position as viewed in FIGURE 1.

As shown, the bar 29 carries a further carriage 33 which may be horizontally positioned on the bar as indicated by the double headed arrow and locked in a desired position by a set screw. The carriage 33 carries a scribing instrument such as a pencil 34 which is mounted to engage a control strip 35. The control strip 35 is similar to motion picture film but may constitute a paper material. The pencil 34 will inscribe on the control strip 35 a line 36 when the control strip 35 is moved in an upward direction. Towards this end, there is provided a drive sprocket wheel 37 interconnected with the moviola projection equipment as indicated by the dot dashed line 38 such that the control strip 35 is driven at a given speed ratio to the speed of projection of the motion pictures on the viewing screen 14.

It will be evident from the structure as described that the pencil 34 will move from side to side in accordance with movements of the frame structure through the intercoupling means in the form of the link 23 and lever 25. The line 36 on the control strip 35 will thus follow a path defined by movements of the frame means across the viewing screen 14. Since the control strip is driven at a fixed speed ratio to the speed of the anamorphic motion pictures projected by the moviola, the recorded line on the strip will constitute a recording of the movements or position of the frame means at corresponding footage points of the anamorphic motion pictures.

In the operation of the structure described in FIGURE 1, and in accordance with first steps of the method, an operator will first project the anamorphic motion pictures by means of the moviola 10 onto the viewing screen 14. He will then manually turn the wheel 20 to position the frame means over the viewing screen 14 in such a manner that desired portions of the projected scenes are covered by the clear picture area frame 19 of the frame means. The control strip 35 is driven at a fixed speed ratio of the driving of the motion picture film 12 as described and as the picture continues, the operator will continuously select desired portions to be viewed by turning the hand wheel 20 or, if a given scene is of a nature that the desired portion thereof is in one area for an extended period, the frame means may be held in its stationary position covering that desired area. In this event, the pencil 34 will inscribed a straight vertical line on the control strip 35 of a duration corresponding to the duration of the scene being projected. As the operator continuously selects the desired portions, the movements of the frame means will be recorded by the pencil 34 and it will thus be evident that the resulting path defined by the line 36 will properly describe the movements of the frame means throughout the entire film projected.

Referring now to FIGURE 2, there is shown an apparatus for enabling editing of the control strip 35 after a recording of the frame movements for a given reel of anamorphic motion pictures has been completed. This editing structure includes a flat table surface table 40, payout reel 41 for the control strip 35 and takeup reel 42. The operator may view the line 36 inscribed on the control strip 35 as he winds the control strip from the reel 41 to the reel 42 and with a French curve or other drafting instrument, he may smooth out any irregularities on the curve. In addition, the operator may make notations directly on the control strip and in an accompanying log book of scene shifts and the like such that in subsequent steps of the method to be presently described, an operator can anticipate when a change in the line path will occur. Such changes, for example, would be correlated with a given length or footage of control strip from its initial starting point.

After the recorded line 36 on the control strip has been properly edited and smoothed out, it is then employed in a printing apparatus for providing the desired standard film which will incorporate only the selected scenes from the anamorphic motion pictures for projection by a standard projector without the use of an anamorphic lens. This apparatus is illustrated in plan view schematically in FIGURE 3.

With reference to FIGURE 3, there is illustrated a projector 43 at the left end of the structure for projecting the anamorphic motion pictures. These projected pictures pass through a projection lens 44 and thence an anamorphic lens 45 to a camera 46 incorporating standard motion picture film. The projection lens 44, in accord with the method and apparatus of this invention, is movably mounted by a table structure 47 provided with tracks 48 and 49 for enabling movement of the projection lens 44 in a direction transverse to the optical path of the pictures from the projector 43 as indicated by the double headed arrow.

Actual movement of the projector lens in this transverse direction is effected by one of a pair of push rods 50 and 51 extending from a drive means 52. In the embodiment illustrated, the push rod 50 is employed for moving the projection lens 44, the push rod 51 simply having a reverse motion to that of the push rod 50 in the event it is desired to reverse movement of the projection lens 44 while operating the drive means in the same direction.

The actual movement of the push rod 50 is effected through a worm gear drive rod 53 extending from the drive means 52 under the table 47 to terminate in a pulley structure 54. A hand crank 55 is coupled to one of the pulleys of the pulley structure 54 through a flexible band as illustrated. Another pulley from the pulley structure 54 is connected by a flexible band to rotate a fly wheel structure 56. The provision of the flexible bands and pulleys together with the fly wheel 56 results in a very smooth rotation of the worm gear drive 53 upon manual rotation of the handle 55.

As will be subsequently clearer from a description of FIGURE 4, the worm gear drive 53 results in rotation of a spur gear 57 in the drive means 52. This spur gear 57 meshes with a rack 58 provided on the push rod 50. Thus rotation of the worm drive rod 53 rotates the spur gear 57 to move the push rod 50 in an in or out direction as indicated by the double headed arrow. It will be noted that the other push rod 51 includes a rack 59 also meshing with the opposite side of the spur gear 57 so that it will be moved simultaneously in an opposite direction. As stated, the push rod 51 is not necessary in the embodiment as described but could be used in lieu of the push rod 50 if it were desired to reverse the motion of the projection lens 44 while turning the worm drive rod 53 in the same direction.

In order to eliminate backlash in the gears involved, there is provided a biasing means in the form of a spring 60 connected between the projection lens 44 and the table 47 as indicated in the dotted lines in FIGURE 3. This biasing spring continuously urges the lens 44 against the push rod 50 thereby maintaining one side of the gear teeth in continuous engagement. Backlash is thus eliminated. In addition, this continuous bias makes it possible to employ a small coupling bar 61 between the projection lens 44 and the end of the push rod 50 which is always in compression. By means of this small coupling rod 61, it is possible to convert from the push rod 50 to the push rod 51 by simply manually removing the coupling rod 61 and positioning it between the end of the push rod 51 and a suitable receiving cavity on the projection lens 44.

Still referring to FIGURE 3, the drive means 52 is coupled to simultaneously operate an indicating or alignment means shown in the upper right hand portion of FIGURE 3.

This alignment means includes an additional push rod 62 having a rack arranged to mesh with an additional spur gear on the same shaft as the spur gear 57. The right hand end of the rod 62 pushes against an intercoupling mechanism including a pivot carriage 63 pivotally supporting a lever member connecting to a rod 64 terminating at its end in a light spot means in the form of a card or disc member 65 positioned behind the control strip 35. A light source 66 included in the alignment means will shine through a small hole in the light spot means in the form of the card 65 to project a spot of light on the control strip 35. In this respect, the control strip 35 is mounted for movement in a downward direction by a sprocket 67 as viewed in FIGURE 3 interconnected to be driven at the given ratio described in conjunction with FIGURE 1 of the speed of the projector 43. This intercoupling to the projector is illustrated by the dashed lines 68 and 69. A similar mechanical intercoupling indicated by the dashed line 70 extends to the camera so that the camera 46 and projector 43 are also run in synchronism.

The foregoing will become clearer with reference to FIGURE 4 wherein the worm gear for the worm drive rod 53 is illustrated at 71 and the additional spur gear is illustrated at 72 for the additional push rod 62. As also clearly illustrated in FIGURE 4, the pivot carriage structure 63 described in FIGURE 3 pivotally supports a lever 73 having an elongated slot 74 receiving a pivot pin 75 in the pivot carriage 63. A guide rod 76 slidably supports the pivot carriage 63 such that the same may be adjusted to vary the fulcrum point for the lever 73 as by means of the set screw along the rod 76. This arrangement enables the extent of movement of the alignment means in the form of the disc or card 65 relative to the control strip 35 to be adjusted relative to movements of the push rod 62.

As illustrated in FIGURE 4, the small light opening is designated at 77 in the card 65 so that light passing through this opening will be visible through the control strip 35.

The alignment means is completed by an additional biasing spring 78 which will urge the intercoupling structure against the push rod 62 in a manner to remove any backlash in the gear 72 and rack for the push rod 62.

From the foregoing description of FIGURES 3 and 4, it will be evident that as the projection lens 44 of FIGURE 3 is moved transversely on the tracks 48 and 49, motion is imparted to the alignment means in the form of the card 65 through the medium of the push rod 62 and intercoupling mechanism such that the card 65 will move transversely across the control strip 35.

In the operation of the apparatus described in FIGURES 3 and 4 for printing a standard film with the selected portions of the anamorphic motion pictures, the control strip 35, after being edited as described in FIGURE 2, is rewound and mounted behind the card 65. The light 66 is energized and the card 65 is moved such that the spot of light through the hole 77 falls on the initial portion of the line 36 on the control strip 35. This movement of the card is effected by cranking the hand crank 55 of FIGURE 3 and such movement will position the projector lens 44 such that the initial anamorphic motion pictures to be passed through the projection lens and anamorphic lens 45 to the film in the camera 46 will result in only the initially selected scene being recorded on the standard film.

The projector 43 and camera 46 along with the control strip are all started simultaneously for recording on the standard film in the camera 46 the selected scenes from the anamorphic motion pictures. These selected scenes are continuously provided on the standard film in the camera 46 as the same is operating by shifting or panning the projection lens 44 transversely to the optical axis of projection in exactly the same manner that the frame structure of FIGURE 1 was shifted relative to the viewing scene 14 in the moviola. Control of the movement of the projection lens is realized by causing the light spot through the hole 77 on the card 65 to follow the line path 36 on the control strip as the control strip moves. Since this line path or recording was determined by the movements of the frame structure in FIGURE 1, the movements of the projection lens in the apparatus of FIGURES 3 and 4 will follow identically these movements and thus project the desired portions of the scenes to be recorded in the camera 46.

The resulting exposed standard film in the camera 46 will thus include non-squeezed or conventional motion picture images as a consequence of the provision of the anamorphic lens 45 which functions to unsqueeze the scene portions selected by the projection lens 44. The resulting film from the camera 46 can now be used in conventional printers to make duplicates or can be projected directly with conventional motion picture projectors without the use of an anamorphic lens. In the case of television projection of the pictures, the resulting scenes projected will fill the entire television screen. Further, only the necessary desired scene portions of the original anamorphic motion pictures are projected and non-essential portions of the scenes are omitted so that the desired objectives of this invention are fully realized. The film in the camera 46 of course could either be 35 mm. or 16 mm. film, it only being necessary to change the camera lens and camera pull down and sprocket drives to change from one type film to the other.

It should be understood that while the actual printing operation described in conjunction with FIGURES 3 and 4 is carried out by a person manually operating the movement of the projection lens 44 by the crank 55 in accordance with the line path 36 on the control strip, this step could be mechanized by employing an electronic feedback servo control responsive to deviations of the light spot from the line 36 to move the projection lens in a direction to bring the light spot back into alignment with the line and thus effect automatic movement of the projection lens. However, inasmuch as it is necessary to always have a person operating the projector and camera and other parts of the printer, he can just as easily manually track the line on the control strip during the printing operation of recording the anamorphic motion pictures on the standard film in the camera 46.

The unique construction of the drive means for the projection lens and also for the alignment means in the form of the card 65 results in a mechanism wherein there is no backlash involved and wherein a very smooth flow of movement of the projection lens results. This latter feature is a consequence of the fly wheel structure and flexible bands connecting the various pulleys 54, 55, and 56 as described in FIGURE 3.

From the foregoing description, it will thus be evident that the present invention has provided a greatly improved method and apparatus for printing desired portions of anamorphic motion pictures on standard motion picture film wherein a continuous panning of the anamorphous motion pictures can take place to enable selection of the desired scene portions best suited for conveying the message of the film.

While the invention has been described with respect to anamorphic motion pictures, it will be immediately evident to those skilled in the art that the method and apparatus are applicable to the printing of motion pictures other than the anamorphic type which have different aspect ratios from conventional standard film frames and television screens. For example, 65 mm. "Todd-A-O," "Ultra Panavision and 35 mm. "Techniscope," while not anamorphic, have aspect ratios in which the width of the pictures is greater than twice the height. Panning these pictures or selecting desired scene portions is carried out in exactly the same manner as described for the anamorphic pictures except that an anamorphic lens during the printing operation is not used.

The word "anamorphic" as used in this specification and claims to describe the pictures from which standard prints are made is to be deemed as including any pictures whose aspect ratios do not conform to that of conventional film.

Modifications may thus be effected in the apparatus shown for realizing the desired results without departing from the scope and spirit of this invention. Accordingly, the method and apparatus is not to be thought of as limited to the specific example set forth merely for illustrative purposes.

What is claimed is:

1. A method of printing desired portions of anamorphic motion pictures on standard film for projection through a standard projector not equipped with an anamorphic lens, comprising the steps of: viewing said anamorphic motion pictures on the viewing screen; moving a frame defining a picture area covering a portion of said anamorphic motion pictures which can be accommodated on a standard film for projection without an anamorphic lens, over said viewing screen as said pictures are being viewed, in a fashion to continuously pan or select desired portions of said motion pictures for viewing; simultaneously moving a control strip driven at a speed defining a given ratio of the speed of said anamorphic motion pictures; marking siad control strip to provide a line on said control strip following a path corresponding to the movement of said frame; thence projecting said anamorphic motion pictures through a projection lens and an anamorphic lens onto a standard film in a motion picture camera; rewinding and then moving said control strip at a speed defining said given ratio of the speed of said projection; and moving said projection lens transversely to the optical path of light passing to said projection lens in accordance with the path of said line on said control strip, whereby only said desired portions of said motion pictures passed through said anamorphic lens are recorded on said standard film in said camera.

2. An apparatus for printing desired portions of anamorphic motion pictures on standard film for projection through a standard projector not equipped with an anamorphoic lens, comprising, in combination: a frame means defining a given picture area on a viewing screen upon which said anamorphic motion pictures are projected at a given speed, said given picture area defining a portion of the scene on said screen which can be accommodated on a standard film for projection without an anamorphic lens; means mounting said frame means to said viewing means for movement back and forth across said screen such that said frame means can be moved to select any desired portion of a scene on said viewing screen; a control strip; means for moving said control strip at a speed defining a given ratio of said given speed; a marking means mounted to engage said strip; coupling means connecting said marking means to said frame means for simultaneous movement with said frame means whereby said marking means inscribes a line on said strip following a path determined by the movements of said frame means; means for movably mounting a projection lens normally in optical alignment between a projector and anamorphic lens for passing said anamorphic motion pictures through said anamorphic lens into a camera incorporating standard film; drive means coupled to said projection lens to effect back and forth movement of the same in a path transverse to the optical path of light from said projector such that given portions of said motion pictures only from said anamorphic lens may be recorded on said film in said camera; means mounting said control strip for movement at a speed constituting said given ratio of the projection speed of said projector; and aligning means movable transversely across said control strip coupled to said drive means for simultaneous movement therewith such that said projection lens may be moved in accordance with said path on said control strip by maintaining said aligning means in alignment with said lie, whereby only said desired scenes on said anamorphic motion pictures are recorded on said standard film in said camera.

3. An apparatus for printing desired portions of anamorphic motion pictures on standard film for projection through a standard projector not equipped with an anamorphic lens, comprising, in combination: a frame means defining a given picture area on a viewing screen upon which said anamorphic motion pictures are projected at a given speed, said given picture area defining a portion of the scene on said screen which can be accommodated on a standard film for projection without an anamorphic lens; means mounting said frame means to said viewing means for movement back and forth across said screen such that said frame means can be moved to select any desired portion of a scene on said viewing screen; a control strip; means for moving said control strip at a speed defining a given ratio of said given speed; a marking means mounted to engage said strip; coupling means connecting said marking means to said frame means for simultaneous movement with said frame means whereby said marking means inscribes a line on said strip following a path determined by the movements of said frame means; means for movably mounting a projection lens normally in optical alignment between a projector and anamorphic lens for passing said anamorphic motion pictures through said anamorphic lens into a camera incorporating standard film, including a table having track means coupled to said lens for guiding movement of said lens; and biasing means urging said lens continuously in one direction; drive means coupled to said projection lens to effect back and forth movement of the same in a path transverse to the optical path of light from said projector such that given portions of said motion pictures only from said anamorphic lens may be recorded on said film in said camera, said drive means including at least one push rod means engaging said lens and having a rack; a spur gear in meshing engagement with said rack; a worm gear having a shaft supporting said spur gear; and a worm drive for said worm gear such that rotation of said worm drive rotates said worm gear and spur gear to move said push rod means against said lens, said biasing means maintaining pressure against said push rod means whereby the effect of backlash in said gears is eliminated; means mounting said control strip for movement at a speed constituting said given ratio of the projection speed of said projector; and aligning means moveable transversely across said control strip coupled to said drive means for simultaneous movement therewith such that said projection lens may be moved in accordance with said path on said control strip by maintaining said aligning means in alignment with said line, whereby only said desired scenes on said anamorphic motion pictures are recorded on said standard film in said camera.

4. An apparatus according to claim 3, in which said aligning means includes an additional push rod means having a rack; an additional spur gear mounted for rotation with said worm gear in meshing engagement with said rack; and a light spot means mounted for back and forth movement across said control strip intercoupling means between said additional push rod means and said light spot means to move said light spot means in response to movement of said additional push rod means; and additional biasing means urging said intercoupling means in a given direction against said additional push rod means to thereby eliminate the effect of backlash in said additional gear, said aligning means being in proper alignment when said light spot means falls on said line on said control strip.

References Cited

UNITED STATES PATENTS

| | | | |
|---|---|---|---|
| 3,199,404 | 8/1965 | Bragg et al. | 355—52 X |
| 3,377,914 | 4/1968 | Jeffee | 355—52 X |

NORTON ANSHER, Primary Examiner

RICHARD A. WINTERCORN, Assistant Examiner

U.S. Cl. X.R.

352—229; 355—40, 74, 77